United States Patent
Eklund

(10) Patent No.: US 11,225,212 B2
(45) Date of Patent: Jan. 18, 2022

(54) ONE PIECE LOAD DISTRIBUTION DEVICE

(71) Applicant: Volvo Car Corporation, Gothenburg (SE)

(72) Inventor: Johan Eklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 17 days.

(21) Appl. No.: 16/813,800

(22) Filed: Mar. 10, 2020

(65) Prior Publication Data

US 2020/0307478 A1    Oct. 1, 2020

(30) Foreign Application Priority Data

Apr. 1, 2019  (EP) .................................... 19166462

(51) Int. Cl.
*B60R 19/02* (2006.01)
*B60K 11/08* (2006.01)
*B60R 19/03* (2006.01)
*B60R 19/34* (2006.01)

(52) U.S. Cl.
CPC ............ *B60R 19/023* (2013.01); *B60K 11/08* (2013.01); *B60R 19/03* (2013.01); *B60R 19/34* (2013.01)

(58) Field of Classification Search
CPC ....... B60R 19/023; B60R 19/03; B60R 19/34; B60R 2019/182; B60R 2019/1853; B60R 19/18; B60R 19/12; B60R 2019/1806; B60K 11/08
USPC .................................................. 293/107, 117
See application file for complete search history.

(56) References Cited

U.S. PATENT DOCUMENTS

| | | | |
|---|---|---|---|
| 7,810,868 B2 | 10/2010 | Braunbeck et al. | |
| 8,454,080 B2 | 6/2013 | Qu et al. | |
| 8,567,849 B2 | 10/2013 | Rawlinson | |
| 9,352,713 B2 | 5/2016 | Bryer et al. | |
| 9,533,642 B2 * | 1/2017 | Hundley | ................ B60R 19/18 |
| 10,894,521 B2 * | 1/2021 | Patberg | ................... B29C 45/14 |
| 2005/0046226 A1 | 3/2005 | White et al. | |
| 2009/0152881 A1 | 6/2009 | Shin | |
| 2011/0156414 A1 | 6/2011 | Gonin et al. | |
| 2011/0204663 A1 | 8/2011 | Baccouche et al. | |
| 2012/0228888 A1 * | 9/2012 | Krammer | ................ B60R 19/03 |
| | | | 293/120 |

(Continued)

FOREIGN PATENT DOCUMENTS

| | | |
|---|---|---|
| CN | 101203415 A | 6/2008 |
| EP | 1884416 B1 | 8/2001 |
| JP | 2006256518 A1 | 9/2006 |

OTHER PUBLICATIONS

Sep. 18, 2019 European Search Report issued on International Application No. 19166462.

*Primary Examiner* — Pinel E Romain
(74) *Attorney, Agent, or Firm* — Clements Bernard Walker; Christopher L. Bernard

(57) ABSTRACT

A load distribution device for a vehicle configured to distribute loads in the event of a collision involving the vehicle, the load distribution device comprises: an upper beam extending in a transversal direction and connectable to at least one upper load path of the vehicle; a lower beam extending in the transversal direction and arrangeable at at least one lower load path of the vehicle; and an interconnecting portion connecting the upper beam and the lower beam, wherein the upper beam, the lower beam, and the interconnecting portion are made in a single piece.

14 Claims, 10 Drawing Sheets

(56) References Cited

U.S. PATENT DOCUMENTS

| | | |
|---|---|---|
| 2014/0062106 A1 | 3/2014 | Han |
| 2018/0222416 A1* | 8/2018 | Jadhav .................... B60R 19/18 |
| 2019/0111872 A1* | 4/2019 | Newcomb ............... B60R 19/34 |
| 2019/0270420 A1* | 9/2019 | Kawamura ............... F16F 7/12 |
| 2020/0108870 A1* | 4/2020 | Cho ..................... B62D 21/152 |
| 2020/0384934 A1* | 12/2020 | Yotsuyanagi ........... B60R 19/34 |
| 2021/0039574 A1* | 2/2021 | Unal ....................... B60R 19/02 |

\* cited by examiner

ONE PIECE LOAD DISTRIBUTION DEVICE

CROSS-REFERENCE TO RELATED APPLICATION

The present disclosure claims the benefit of priority of co-pending European Patent Application No. 19166462.2, filed on Apr. 1, 2019, and entitled "ONE PIECE LOAD DISTRIBUTION DEVICE," the contents of which are incorporated in full by reference herein.

TECHNICAL FIELD

The present disclosure relates to a load distribution device for a vehicle configured to distribute loads in the event of a collision.

BACKGROUND

Conventional bumpers mounted at the front and rear of vehicles function to withstand at least minor impacts. The bumpers are often attached to the lower frame beam rails of the vehicle and are configured to absorb the impact energy for protection of the self-vehicle and its passengers. The conventional bumpers often include energy absorbing beams that are configured to deform in the event of a crash impact.

In a frontal collision the bumper and other energy absorbing parts of the so-called crumple zone of the vehicle absorb a portion of the energy from the impact. This may protect the self-vehicle but does not traditionally take into account the safety of the opposing vehicle in the impact. In other words, the functionality of conventional bumper systems is first and foremost intended to protect the self-vehicle.

More recently, focus has been shifted to concern also the opposing vehicle in the impact. This is particularly important when a lighter vehicle collides with a heavier vehicle. As can be understood from the principle of conservation of momentum, the lighter of the two vehicles has to withstand a higher load than the heavier vehicle.

Accordingly, there is a desire to better distribute the load in a head on collision between two vehicles.

SUMMARY

Upcoming legislation (issued by the European new car assessment programme) in Europe requires vehicles to be tested for a new test case which relates to impact with a so-called moving progressive deformable barrier, for example another vehicle. The inventors realized that one way to provide a satisfactory solution for handling the new test case is to provide a relatively stiff load distribution device that covers a relatively large area of the vehicle front to thereby distribute loads more evenly into the opposing barrier, e.g. the opposing vehicle.

Accordingly, the disclosed subject matter generally relates to a load distribution device which is adapted to distribute the load from an impact more evenly into the lighter partner vehicle colliding with the self-vehicle. Further, with the proposed load distribution device the crumple zone of the self-vehicle is able to absorb more energy rather than that the lighter vehicle absorbs the most energy.

The proposed load distribution device provides the above advantage at least partly by being made in single piece that is connectable to at least one upper load path and arrangeable at least one lower load path of the vehicle. Advantageously, the load distribution device thereby connects upper and lower load paths of the vehicle structure in the event of a collision such that the impact load is distributed over a relatively large area, and into both the upper load path and the lower load path into the vehicle structure.

That the load distribution device is made in a single piece provides improved structural integrity compared to a multiple piece device. Thus, the single piece load distribution device can better withstand the high forces developed in a crash, which also enables the load distribution device to better distribute the loads.

Furthermore, for improved distribution of loads in the transverse direction, the load distribution device comprises an upper beam and a lower beam connectable to a respective upper and lower load path of the vehicle.

The interconnecting portion advantageously connects the upper beam and the lower beam, which thereby provides for connecting the upper and lower load paths to each other. As is understood, the interconnecting portion is made from the same stiff material as the upper beam and the lower beam.

Although embodiments of the present disclosure describes that the lower beam is arrangeable at the lower load path, it is also possible for the lower beam to be connectable to the at least one lower load path according to embodiments. This ensures a firm attachment of the load attachment device to the vehicle when mounted.

To be able to connect the upper and lower load paths to each other the size of the load distribution device is larger than prior single piece devices such as prior art bumper or similar devices.

The size of the load distribution device may, according to some embodiments be such that a through-hole is needed for allowing cooling air to reach behind the load distribution device. The cooling air may be directed to any known devices in need of cooling, such as a radiator, a battery, etc. The through-hole is made in the interconnecting portion.

Preferably, the through-hole is located between the upper beam and the lower beam.

In embodiments, the interconnecting portion is plate shaped, and is connected to the upper beam and the lower beam at front walls of the upper beam and the lower beam. This advantageously provides for a relatively planar front side of the load distribution device.

In some embodiments the upper beam is connectable to at least one upper crash absorbing member and the lower beam is connectable or arrangeable at at least one lower crash absorbing member. Thus, the load distribution devices may be able to connect the crash absorbing members to each other at least in the event of a collision which thereby improves the load absorption the load by means of the interconnected upper and lower crash absorbing members.

In embodiments, the at least one upper crash absorbing member is attached to the vehicle chassis and the least one lower crash absorbing member is attached to a subframe or other chassis structure components of the vehicle. This provides an efficient transfer of the load into both the upper load path and the lower load path.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing example embodiments of the invention, wherein.

DETAILED DESCRIPTION

Figure 1A:
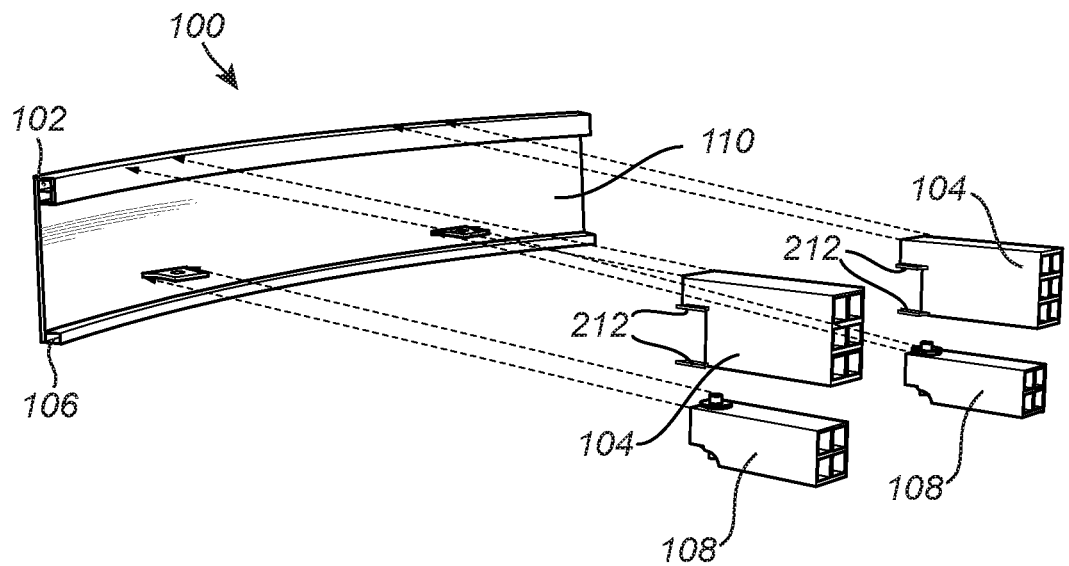
FIG. 1A-B are perspective views of a load distribution device according to embodiments of the present disclosure.

In the present detailed description, various embodiments of a load distribution device according to the present invention are described. However, this invention may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

Figure 1B:
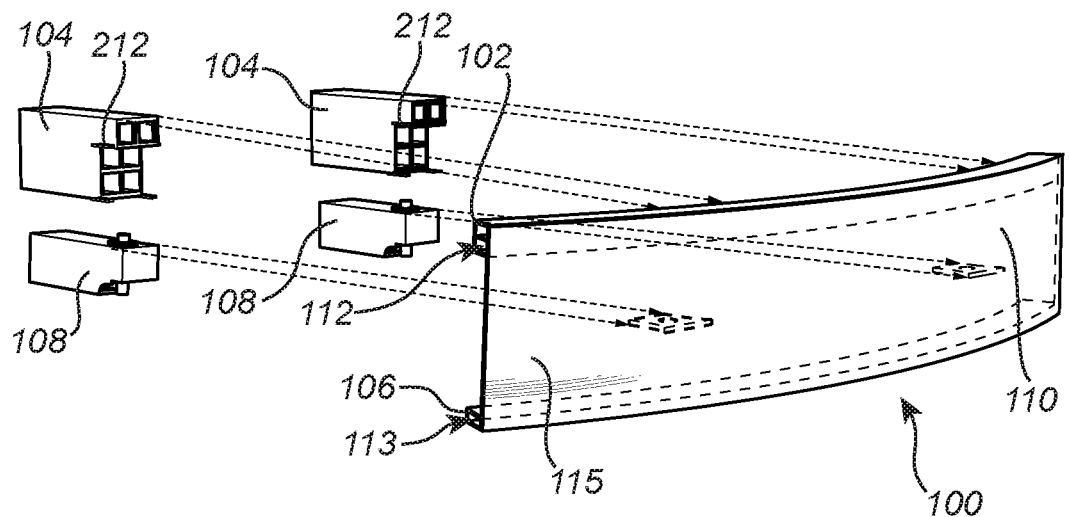

FIGS. 1A-B conceptually illustrate different views of a load distribution device 100 for a vehicle. The load distribution device 100 is configured to distribute loads in the event of a collision involving the vehicle.

The load distribution device 100 comprises an upper beam 102 extending in a transversal direction and connectable to at least one upper load path, here exemplified by being connectable to at least one upper crash absorbing member 104 of the vehicle, and a lower beam 106 extending in the transversal direction and arrangeable at at least one lower load path, here exemplified by being connectable to at least one lower crash absorbing member 108 of the vehicle.

Furthermore, the load distribution device 100 comprises an interconnecting portion 110 connecting the upper beam 102 and the lower beam 106.

The upper beam 102, the lower beam 106, and the interconnecting portion 110 are made in a single piece, preferably by an extrusion process. In other words, the entire load distribution device 100 is manufactured in a single extrusion process to form a one piece load distribution device 100. The load distribution device 100 can in this way, by extrusion, be manufactured relatively quickly. Furthermore, the load distribution device 100 can be manufactured in light weight materials such as carbon composites or aluminium alloys, or only aluminium. The extrusion direction is in the width direction, along the transversal direction of the upper and lower beams 102 and 106 of the load distribution device 100.

The inventors realized to provide a single piece load distribution device which is designed to connect upper load paths with lower load paths, to in this way distribute loads from an impact more evenly into the colliding, opposing barrier. In contrast, with prior art devices only connected to one of the upper and lower load paths, the absorbing area of the vehicle with the prior art device is smaller than with the load distribution device of the present disclosure. For example, a narrow beam connected to only lower crash absorbing members has a relatively small area which impacts the incoming barrier and will thus penetrate relatively far into the barrier. The load distribution device of the present disclosure which may be connect to both the upper and the lower paths, e.g. by connecting upper crash absorbing members and lower crash absorbing member, can better handle the load from the impact with the barrier and distribute it over a larger area. Consequently, the vehicle having the load distribution device will not penetrate far into the colliding barrier.

Accordingly, the inventors realized that the load distribution device should be relatively large in order to provide the desired advantages described above. More precisely, a larger load distribution device provides for distributing the load into the opposing barrier more evenly. Further, that the load distribution device connects the upper load path and the lower load path of the vehicle enables for the vehicle to absorb more energy than if only one load path is connected to the load distribution device.

In addition, when the vehicle carrying the load distribution device of the present disclosure is heavier than the counterpart vehicle, the load distribution device facilitates for the larger vehicle to absorb more energy that the lighter counterpart vehicle due to the distribution into both the upper crash absorbing member and the lower crash absorbing members.

Preferably, the load distribution device 100 spans a large portion of the entire width of the vehicle, e.g. at least 90% of the width. With such wide construction also small overlap collision situations are addressed and not only head-on collisions. In addition, in this way the width of the load distribution device 100 is made as large as possible within design requirements and restrictions of the vehicle.

The load distribution device 100 may be somewhat bent, thus the front side of the load distribution device is curved in the width direction. The curved shape may be obtained by firstly extruding the load distribution device 100 in a straight shape, and subsequently shaping it by a stretch bending technique. A curved design provides the advantage that the shape of the load distribution device follows the front styling of the vehicle effectively.

The load distribution device 100 may be mechanically connected to the upper crash absorbing members 104 and the lower crash absorbing members 108 by various means, some of which will be described with reference to subsequent drawings.

The upper crash absorbing members 104 and the lower crash absorbing members 108 may generally by known as so-called crash boxes. A crash box is configured to deform in order to absorb energy in the event of a collision. A conventional bumper is often mechanically fixated to lower crash boxes. With the inventive load distribution device 100, lower crash absorbing members 108, e.g. lower crash boxes, are connected to upper crash absorbing members 104, e.g. upper crash boxes, via the load distribution device to thereby distribute the energy from a collision over a larger area. This leads to that the load into the colliding lighter opposing partner vehicle is distributed over a larger area, sparing the lighter partner vehicle, and resulting in that the larger self-vehicle absorbs more energy than what it would had done with a smaller conventional bumper.

Further, the upper beam 102 and the lower beam 106 are hollow which reduces the weight of the load distribution device 100. The beams 102 and 106, are shown to have two and one cells respectively. However, the beams may include any appropriate number of cells and the beams illustrated herein are shown for exemplary purposes.

Figure 2A:
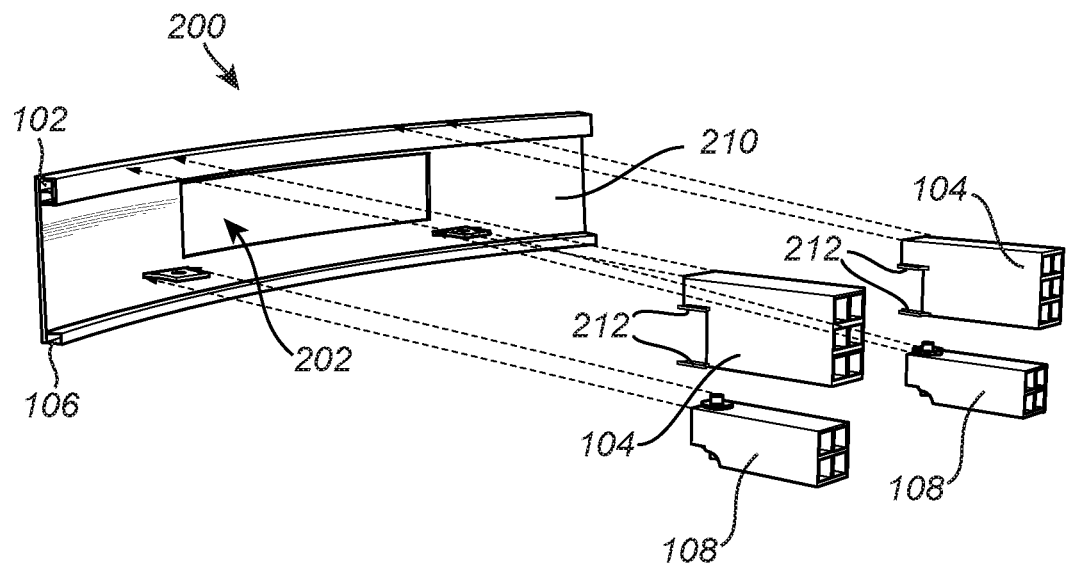
FIG. 2A-B are perspective views of a load distribution device according to embodiments of the present disclosure.
Figure 2B:
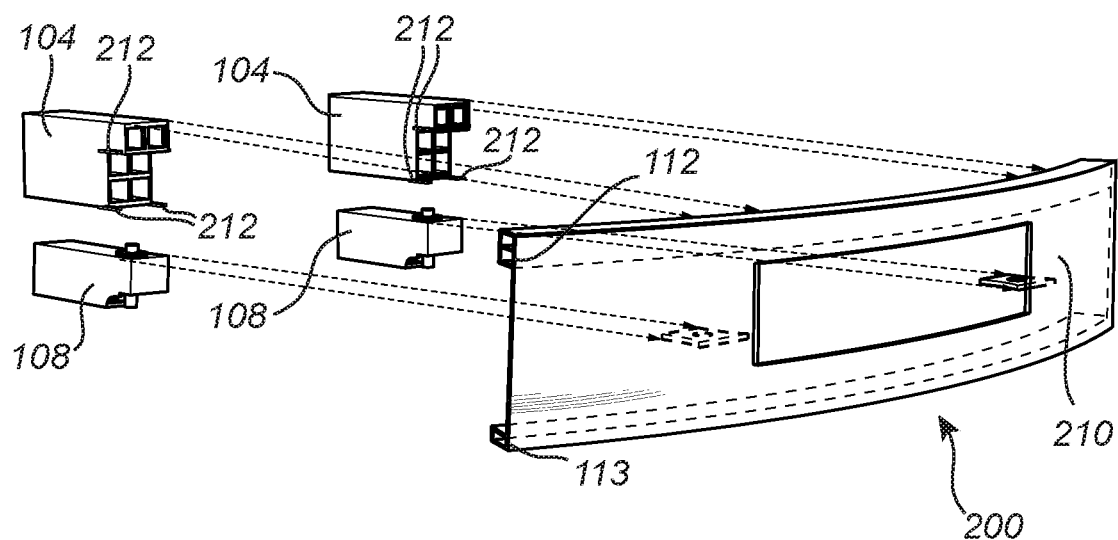

FIGS. 2A-B conceptually illustrates different views of a load distribution device 200 according to embodiments of the present disclosure. Due to the size of the load distribution device 200 a through-hole 202 in the load distribution device may be needed to allow cooling air to reach components behind the load distribution device 200. Accordingly, as is shown in FIGS. 2A-B, the interconnecting portion 210 comprises a through-hole 202 for allowing cooling air to reach behind the load distribution device 200. The load distribution device 200 may be arranged with the through-hole 202 behind a grille of the vehicle, but this depends on the specific design and specifications of the vehicle.

The through-hole 202 is located between the upper beam 102 and the lower beam 106.

The interconnecting portion 210 is generally plate shaped, and preferable curved, and is connected to the upper beam 102 and the lower beam 106 at front walls 112, 113 of the upper beam 102 and the lower beam 106. In other words, in the extrusion process for manufacturing the load distribution device, the interconnecting portion is formed as an extension of the front walls 112 and 113 of the upper beam 102 and the lower beam 106 respectively. This advantageously forms a flat front side 115 of the load distribution device 100. A relatively flat front side 115 provides for good distribution of the load into the colliding barrier.

The height of the load distribution device is preferably such that it covers a relatively large portion of the vehicle front in order to distribute the load over a large area. For example, the upper beam 102 and the lower beam 106 may be separated by a distance larger than the vertical length of the each of the upper beam 102 and the lower beam 106. Thus, the interconnecting portion 210 is larger in height than both of the upper beam 102 and the lower beam 106. Preferably, the load distribution device covers an area from about 200-250 mm from the ground to about 600-650 mm from the ground, when mounted on a vehicle.

Figure 3A:
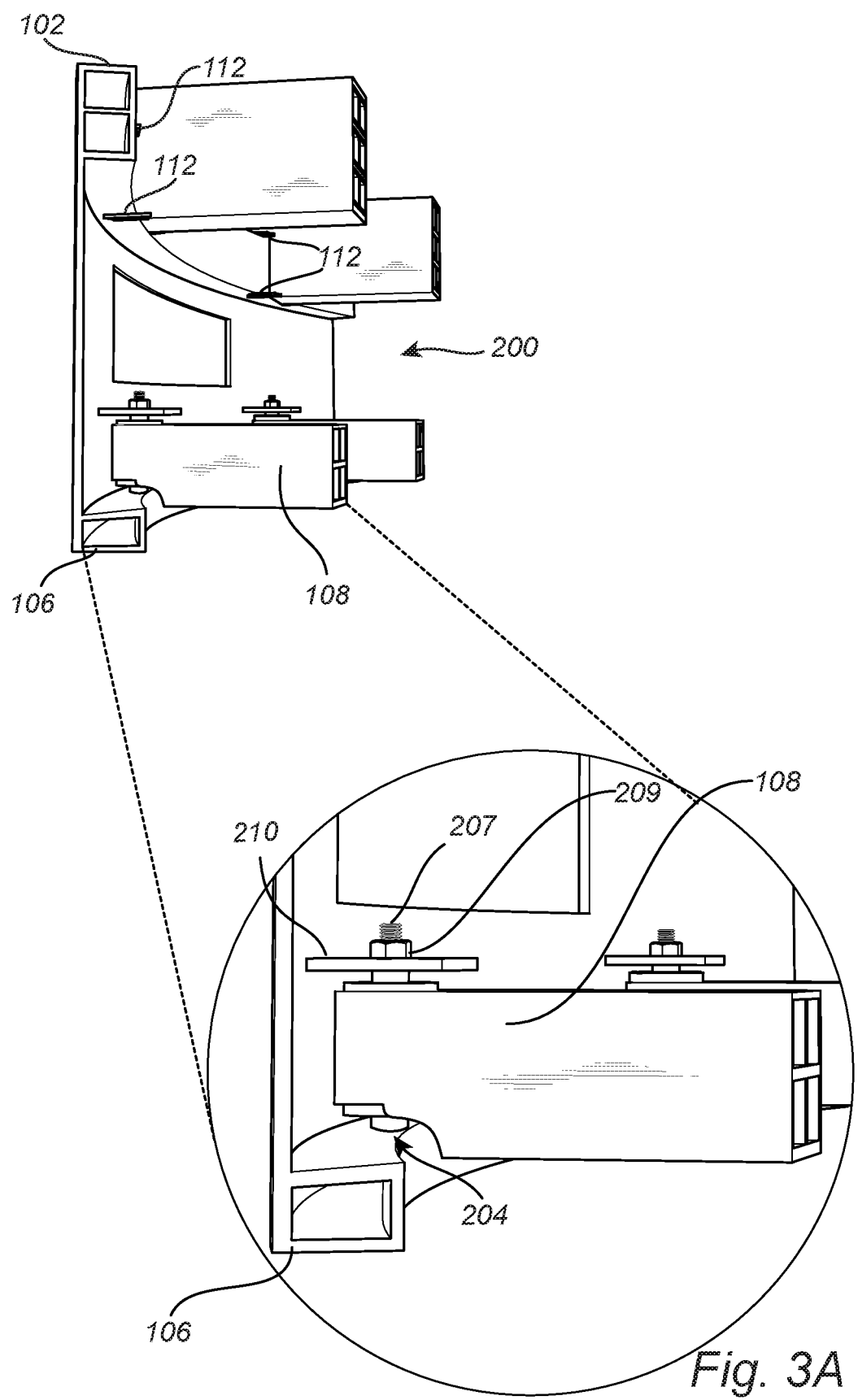
FIG. 3A conceptually illustrates an attachment location of a load distribution device to crash absorbing members.
Figure 3B:
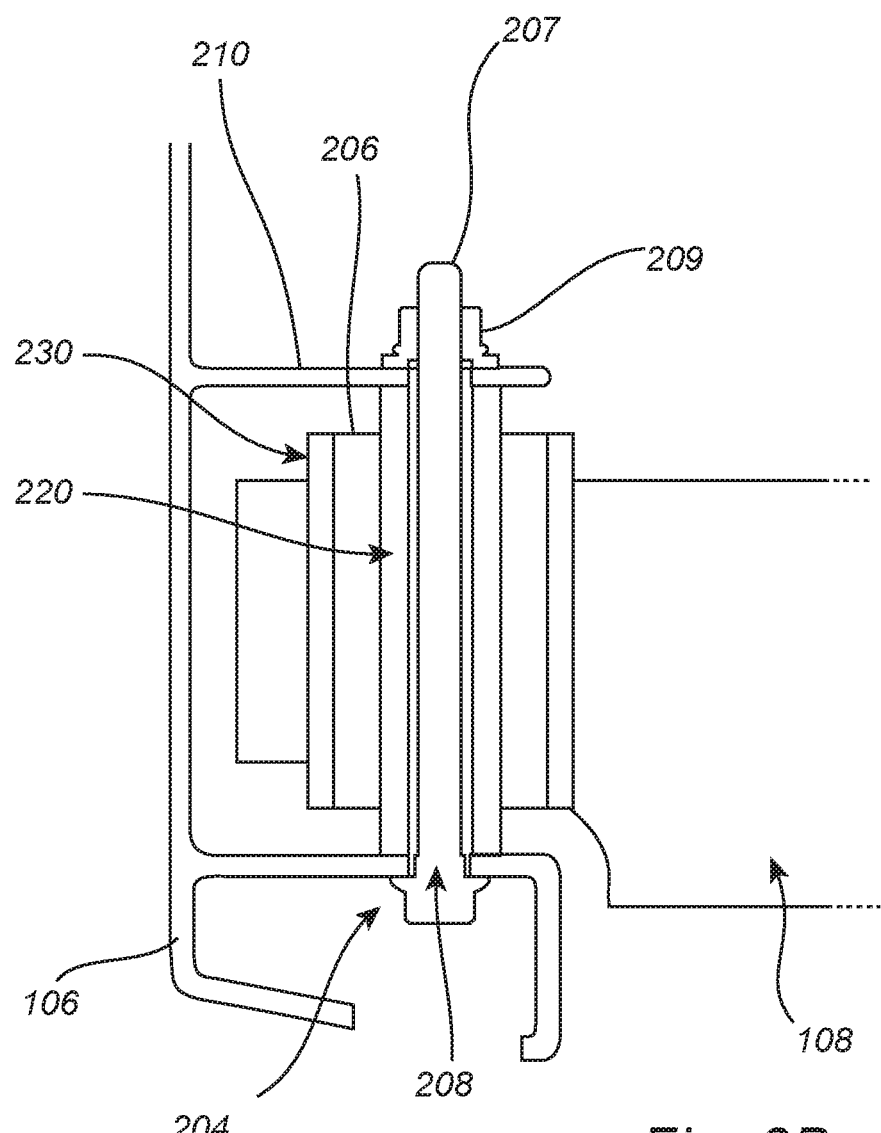
FIG. 3B is a cross-section of the attachment at the lower crash absorbing member in FIG. 3A.

FIG. 3A conceptually illustrates one advantageous way of attaching the load distribution device 100, 200 to the crash absorbing members. FIG. 3B is a cross-section of one of the attachment locations.

As illustrated in FIG. 3A, the lower beam 106 comprises attachment points 204 adapted for attaching the lower beam 106 to the at least one lower crash absorbing member via bushings. The attachment points 204 are provided in the form of a hole, better seen in FIG. 3B into which a bolt or screw 207 is attached (see the cross-section illustrated in FIG. 3B).

As shown in FIG. 3B, the bolt or screw 207 is arranged through the hole 208 of the crash absorbing member 108, through the hole 204 of the lower beam 106, and through a hole of the flange 210.

In the through-hole 208 of the crash absorbing member 108 is the bushing arranged. The bushing includes a resilient member 206, e.g. a rubber tube or gasket having a tube shape. The rubber gasket 206 of the bushing surrounds an inner sleeve 220 preferably made from a metal such as aluminium. An outer sleeve 230 of the bushing surrounds both the rubber gasket and the inner sleeve 220. Thus, the bushing includes the coaxially arranged inner sleeve 220, rubber gasket 206, and outer sleeve 230. The bushing surrounds the bolt or screw 207, i.e. the bolt or screw 207 is arranged though the inner sleeve 220. The bushing is interleaved between the flange 210 and the hole 204.

With the bushing 206 some vibrations and/or movements are allowed for the load distribution device 200 and/or the crash absorbing members 108 and 104 without causing excessive noise at the interface there between. The gasket of the bushing may be a rubber or plastic gasket. The bolt or screw 207 is tightened with a nut 209 arranged on the opposite side of flange 210 having a through hole axially separated from the attachment point 204. The bolt or screw 207 is thus arranged through both the through-holes in the flange 210 and the through-holes 204 in the lower beam 106 below the flange 210, on the opposite side of the crash absorbing member 108.

The upper beam 102 is attached to the upper crash absorbing members 104 by known means such as bolting or welding e.g. at flanges 212 of the upper crash absorbing members 104.

Figure 4A:
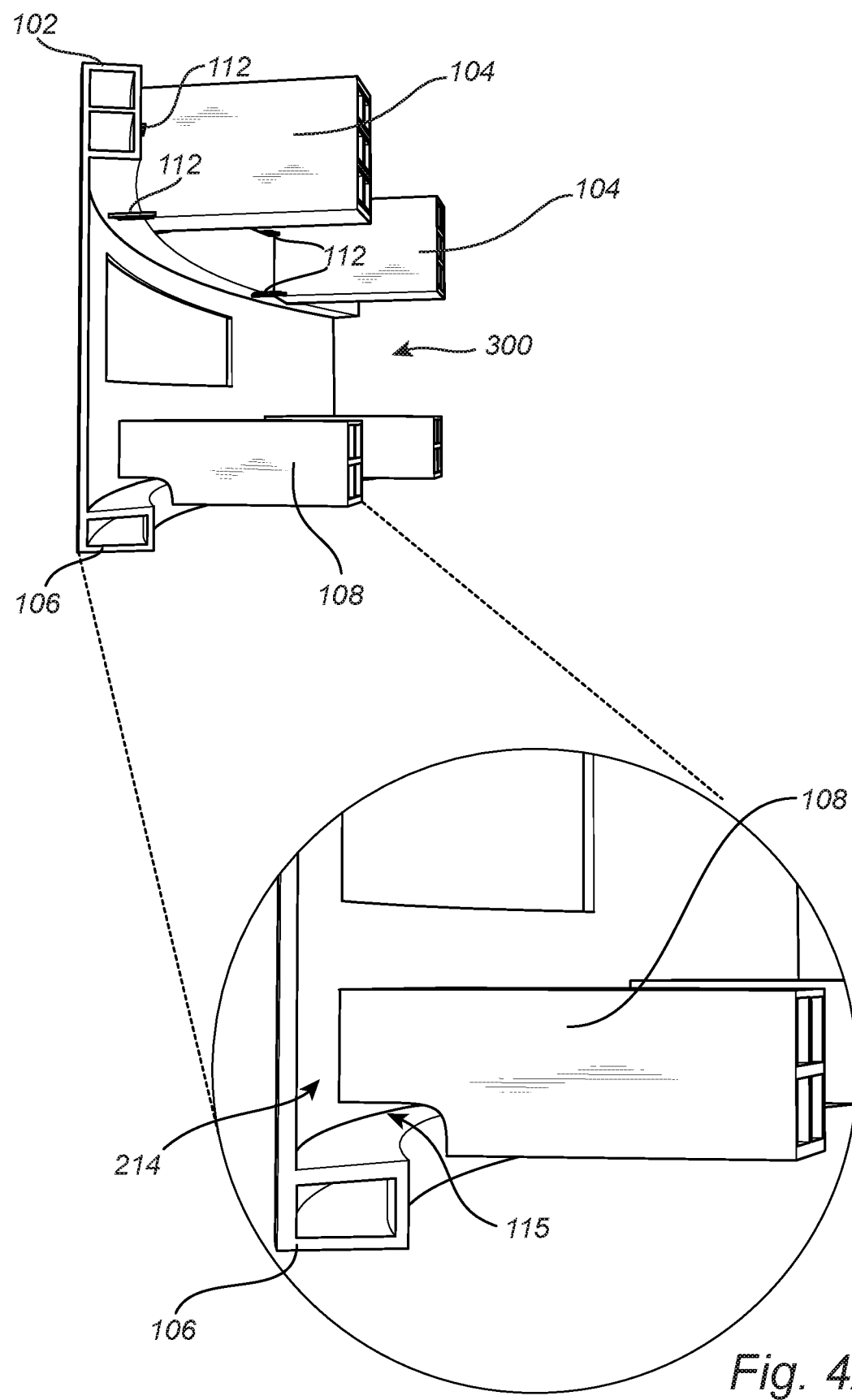
FIG. 4A conceptually illustrates an attachment location of a load distribution device to crash absorbing members.
Figure 4B:
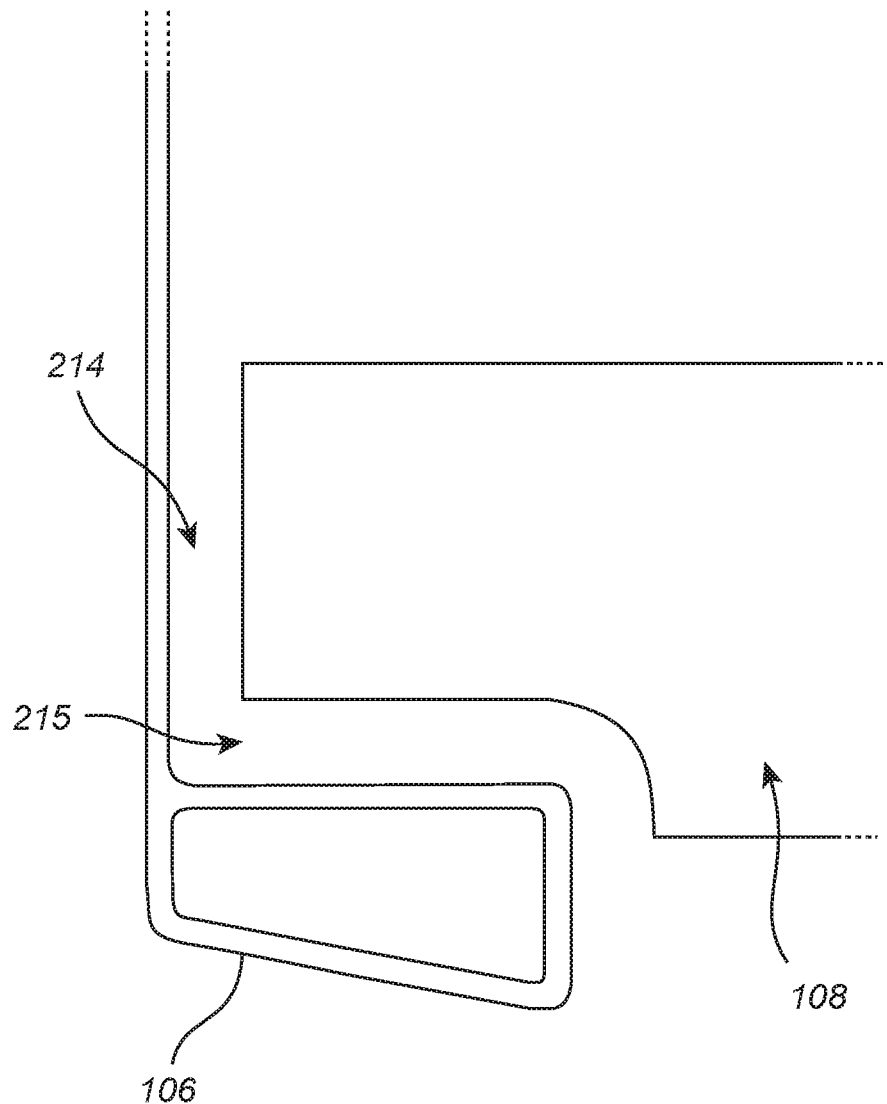
FIG. 4B is a cross-section illustrating a clearance between the lower crash absorbing member and the lower beam in FIG. 4A.

FIG. 4A-B illustrate another possible attachment arrangement. Here, the upper beam 102 is attached to the upper crash absorbing members 104 as described above. However, the lower beam 106 is adapted to be arranged at the lower crash absorbing member 108 with a longitudinal clearance 214 and a height clearance 215 to allow for a relative movement between the load distribution device and the lower crash absorbing member.

Thus, the load distribution device 300 is not mechanically connected to the lower crash absorbing members 108. In this way, a movement of the lower crash absorbing members 108 with respect to the load distribution device 300 is allowed which may reduce noise.

Furthermore, having the load distribution device 300 arranged with a clearance and not mechanically connected to the lower crash absorbing members 108 facilitates removal and installation of the load distribution device 300 from/to the vehicle since there is no need for untightening or tightening fastening means located behind the load distribution device 300 that may be difficult to reach.

Figure 5:
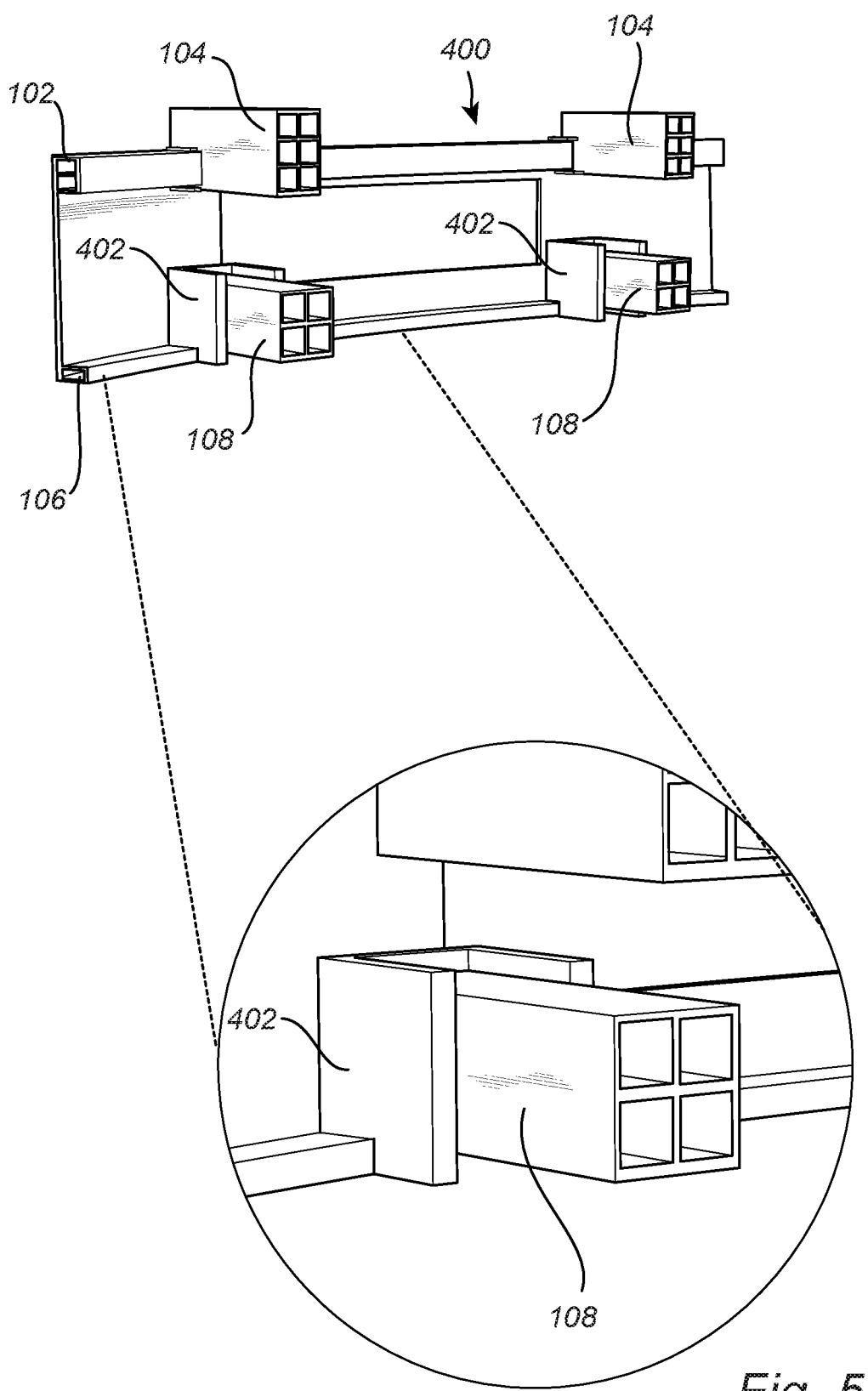
FIG. 5 perspective views of a load distribution device according to embodiments of the present disclosure.

FIG. 5 illustrates another embodiment with clearances between the load distribution device 400 and the lower crash absorbing members 108 as described with reference to FIGS. 4A-B. However, the beam 106 is interrupted by shaped support members 402 in the form of U-shaped brackets adapted to receive the lower crash absorbing members 108. The brackets 402 which are arranged in cut out portions of the lower beam 106 provides for local support for the lower crash absorbing members 108 which prevents them form falling out of position, in particular in the event of a collision. The cut out portions in the beam also provides for better service access to the crash absorbing members 108.

Figure 6A:
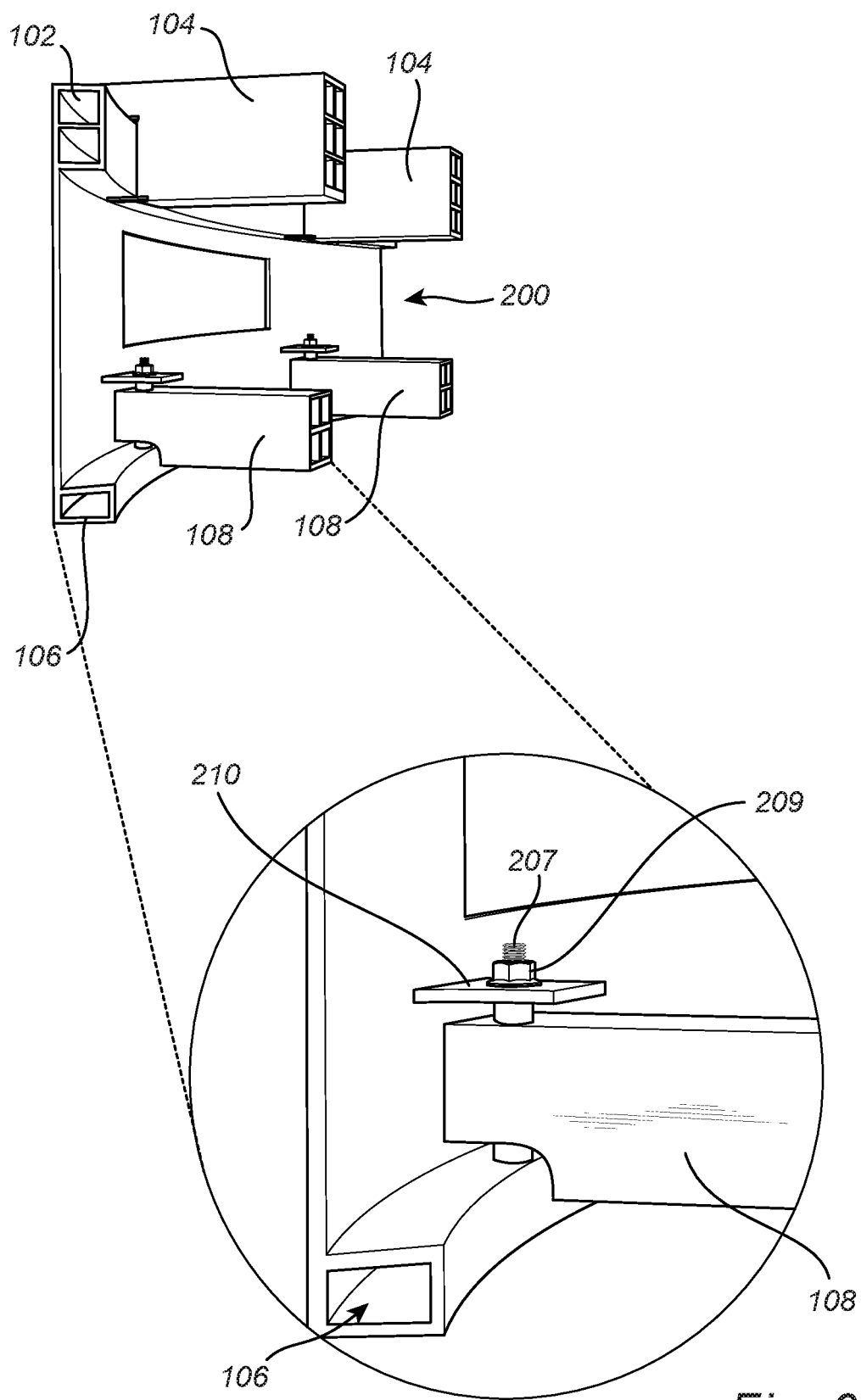
FIG. 6A conceptually illustrates an attachment location of a load distribution device to lower crash absorbing members.
Figure 6B:
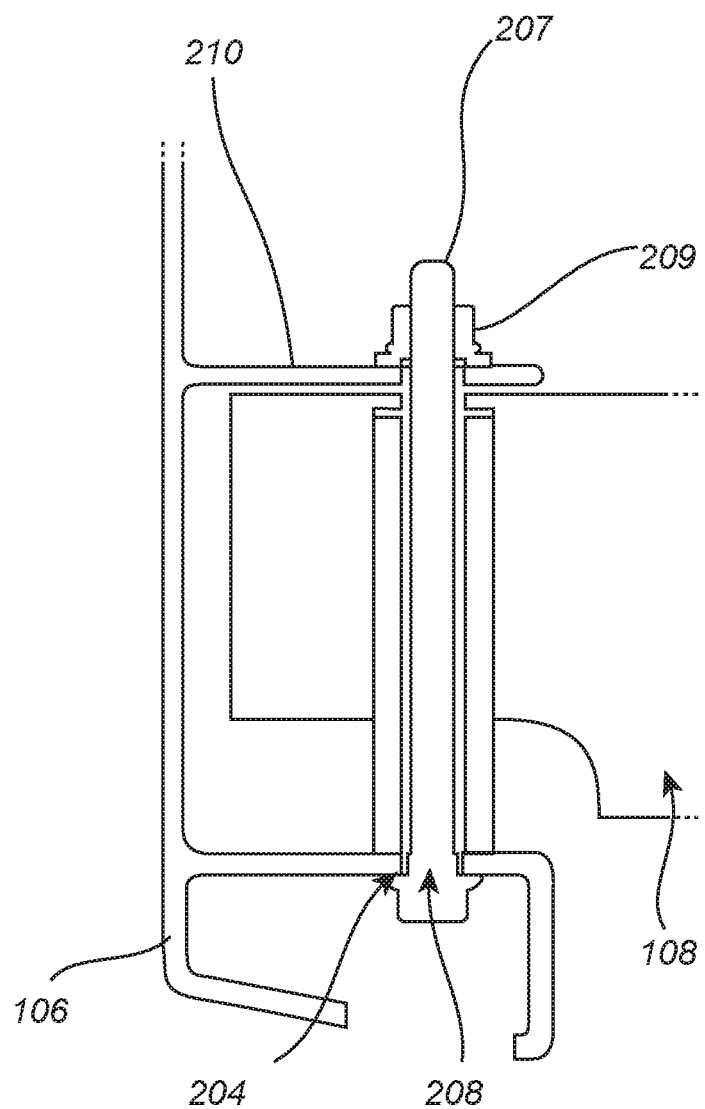
FIG. 6B is a cross-section of the attachment at the lower crash absorbing member in FIG. 6A.

With reference to FIGS. 6A-B, the lower beam 106 may be attached to the at least one lower crash absorbing member 108 with a bolt or screw 207 arranged through the through-hole 208 of the crash absorbing member 108, through a through-hole 204 of the lower beam 106, and a through-hole in the upper flange 210 with a nut 209 on the opposite side of the flange 210. The difference between the attachment solution shown in FIG. 6A-B and the one shown in FIG. 3A-B is that in FIG. 6A-B, no bushing is used.

Figure 7:
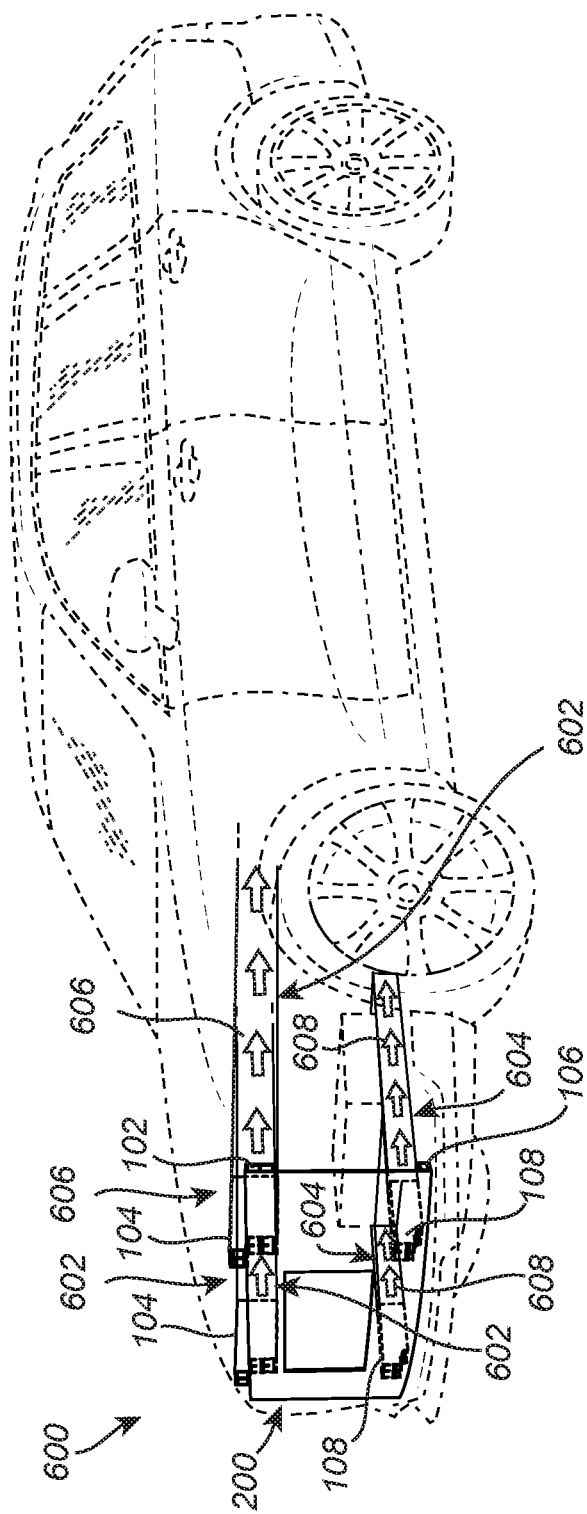
FIG. 7 conceptually illustrates a vehicle front structure according to embodiments of the present disclosure.

FIG. 7 illustrates an example vehicle front structure 600 according to embodiments of the present disclosure. The front structure 600 comprises a load distribution device 100 or 200 according to embodiments described above. Further, the vehicle front structure 600 comprises at least one upper crash absorbing member 104, and at least one lower crash absorbing member 108. In this example embodiment, there are two upper crash absorbing members 104, and two lower crash absorbing members 108. The upper beam 102 of the load distribution device 100 is connected to upper crash absorbing members 104 and the lower beam 106 is connected to the lower crash absorbing members 106.

The upper crash absorbing members 104 are attached to the vehicle body 602 and the lower crash absorbing members 108 are attached to a subframe 604 or other chassis structure components of the vehicle, depending on the specific structure of the vehicle. The upper crash absorbing members 104 and the vehicle body 602 provides upper load paths 606. The lower crash absorbing members 108 and the subframe 604 provides lower load paths 608. The load paths 606 and 608 are intended for leading the load from a front collision rearward in the vehicle structure.

With the upper beam 102 connected to the upper crash absorbing members 104 and the lower beam 106 connected to the lower crash absorbing members 108, the upper path 606 and the lower path 608 are connected to each other via the load distribution device 200. Thereby, load from a front collision is better absorbed and distributed by the vehicle comprising the front structure 600.

The lower load path 608 may include e.g. extrusion sills along sides of the vehicle to thereby transfer load rearwards in the vehicle. The upper load path may include a path through e.g. A-pillars and side beams of the vehicle to transfer load rearwards.

With the load distribution device 200 being made in a single piece the load distribution is structurally stronger and therefore better adapted to distribute the loads to the upper and lower load paths compared to a multi-piece device which has been assembled. Such multi-piece devices may collapse at the joints.

The person skilled in the art realizes that the present invention by no means is limited to the preferred embodiments described above. On the contrary, many modifications and variations are possible within the scope of the appended claims.

For example, the shape of the load distribution device may be different from what is shown in the depicted embodiments. The particular shape of the load distribution device may depend on design parameters of the vehicle.

Herein the load distribution device is shown with reference to pairs of upper and lower crash absorbing members. The load distribution device may in some cases be applicable also to cases where only upper or lower crash absorbing members are present in the vehicle.

There is further provided a vehicle comprising the load distribution device according any one of the embodiments present herein. In addition, a vehicle may comprise the vehicle front structure according to presented embodiments herein.

The load distribution device according to any one of the presented embodiments is adapted to be arranged at a front structure of a vehicle.

The upper crash absorbing members and the lower crash absorbing members may be crash boxes, although other types of crash absorbing members known in the art may also be applicable depending on the specific design of the vehicle front.

The vehicle may be of various types, however the preferred vehicle is a light-duty vehicle such as a car, although lighter trucks may also be equipped with the load distribution device.

The load distribution device may have additional though holes or installation points for the mounting of horns or other devices in or behind the load distribution device.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A load distribution device for a vehicle configured to distribute loads into a colliding barrier in the event of a collision involving the vehicle, the load distribution device comprising:
    an upper beam extending in a transversal direction and connectable to at least one upper load path of the vehicle, the upper beam comprising at least one hollow cell;
    a lower beam extending in the transversal direction and arrangeable at at least one lower load path of the vehicle, the lower beam comprising at least one hollow cell; and
    an interconnecting portion connecting the upper beam and the lower beam,
    wherein the upper beam, the lower beam, and the interconnecting portion are made in a single piece by extrusion.

2. The load distribution device according to claim 1, wherein the interconnecting portion comprises a through hole for allowing cooling air to reach behind the load distribution device.

3. The load distribution device according to claim 2, wherein the through hole is located between the upper beam and the lower beam.

4. The load distribution device according to claim 1, wherein the lower beam is adapted to be arranged at at least one lower crash absorbing member with a clearance to allow for a relative movement between the load distribution device and the lower crash absorbing member.

5. The load distribution device according to claim 1, wherein the lower beam is connectable to the at least one lower crash absorbing member, and the upper beam is connectable to at least one upper crash absorbing member.

6. The load distribution device according to claim 5, wherein the lower beam comprises attachment points adapted for attaching the lower beam to the at least one lower crash absorbing member via bushings.

7. The load distribution device according to claim 1, made from a material comprising aluminum or a carbon composite.

8. The load distribution device according to claim 1, wherein the interconnecting portion is plate shaped, and is connected to the upper beam and the lower beam at front walls of the upper beam and the lower beam.

9. The load distribution device according to claim 1, wherein the upper beam and the lower beam are separated by a distance larger than a vertical length of the each of the upper beam and the lower beam.

10. The load distribution device according to claim 1, wherein the width of the load distribution device spans substantially the entire width of the vehicle.

11. The load distribution device according to claim 1, wherein the upper beam is connectable to the at least one upper crash absorbing member of the vehicle while the lower beam is connected to or arranged at the at least one lower crash absorbing member of the vehicle, or wherein the lower beam is connectable to the at least one lower crash absorbing member of the vehicle while the upper beam is connected to the at least one upper crash absorbing member of the vehicle.

12. The load distribution device according to claim 1, wherein the height of the load distribution device spans upper and lower load paths of a vehicle front structure.

13. A vehicle front structure comprising:
a load distribution device according to claim 1;
at least one upper crash absorbing member; and
at least one lower crash absorbing member,
wherein the upper beam is connected to the at least one upper crash absorbing member and the lower beam is connectable to the at least one lower crash absorbing member.

14. The vehicle front structure according to claim 13, wherein the at least one upper crash absorbing member is attached to the vehicle body and the least one lower crash absorbing member is attached to a subframe or other chassis structure components of the vehicle.

* * * * *